(No Model.) 2 Sheets—Sheet 2.

E. ADAM & M. O. REHFUSS.
FILTER.

No. 510,756. Patented Dec. 12, 1893.

UNITED STATES PATENT OFFICE.

EDWIN ADAM AND MARTIN O. REHFUSS, OF PHILADELPHIA, PENNSYLVANIA; SAID REHFUSS ASSIGNOR TO SAID ADAM.

FILTER.

SPECIFICATION forming part of Letters Patent No. 510,756, dated December 12, 1893.

Application filed November 19, 1892. Serial No. 452,485. (No model.)

*To all whom it may concern:*

Be it known that we, EDWIN ADAM and MARTIN O. REHFUSS, citizens of the United States, both residing in the city and county of Philadelphia, State of Pennsylvania, have invented a new and useful Improvement in Filters, which improvement is fully set forth in the following specification and accompanying drawings.

Our invention consists of improvements in filters, more particularly designed for beer, the same embodying a novel arrangement of filtering chambers to equalize the pressure of the fluid; next, an ejector for withdrawing gas or air from the filtering chambers and assisting the fluid to flow freely from the same, and, finally, of wrappings for the reticulated or perforated walls of said chambers, the same forming strainers which trap or collect more solid matters such as yeast cells, albuminoids, &c., when the filter is used for beer, &c.

Figure 1:
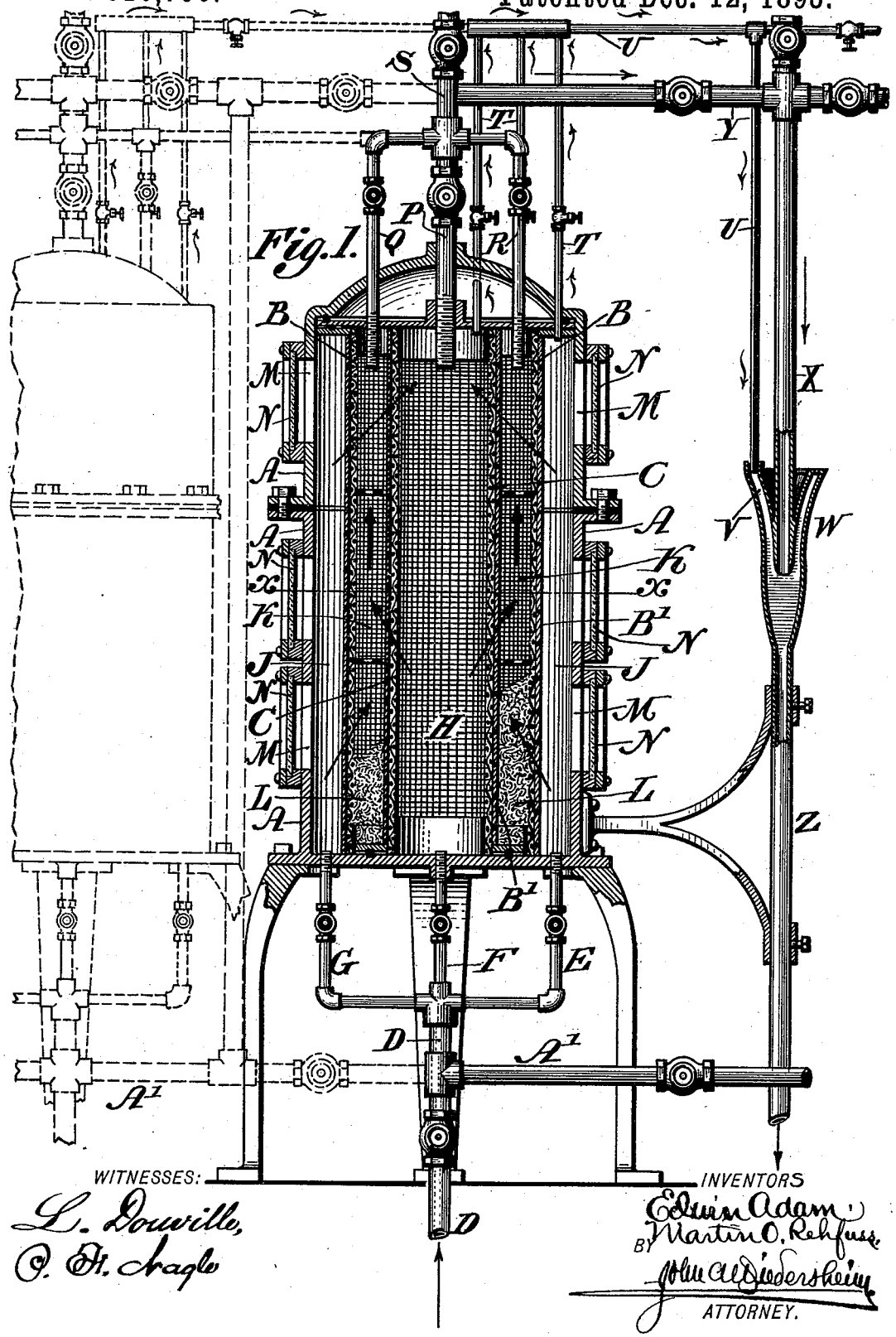
Figure 2:
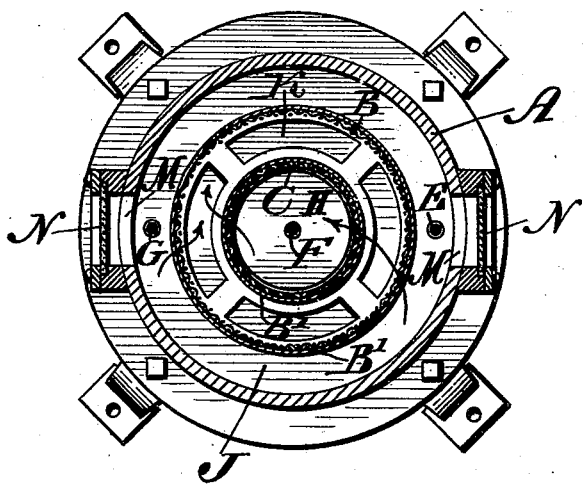
Figure 3:
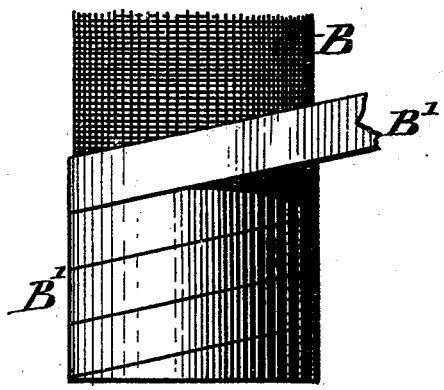
Figure 4:
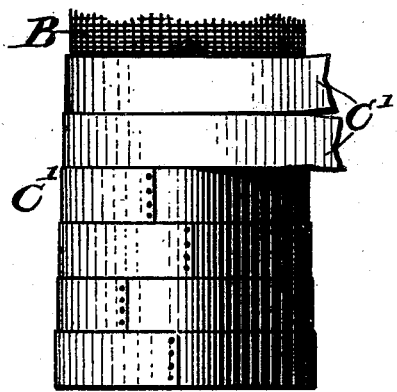

Figure 1 represents a vertical section of a filter embodying our invention. Fig. 2 represents a horizontal section on line $x$, $x$, Fig. 1. Fig. 3 represents a side view of a detached portion thereof. Fig. 4 represents a side view of a modification of the portion shown in Fig. 3.

Similar letters of reference indicate corresponding parts in the several figures.

Referring to the drawings:—A designates the casing of a filter, within which are the concentric partitions B and C, which are formed of gauze or reticulated or perforated material.

D designates a supply pipe with which are connected the branches E, F and G, the branch F leading into the central chamber H, which latter is formed by the partition C, and the branches E and G leading into the chamber J formed by the wall of the casing A and the partition B.

Between the partitions B and C is a chamber K, which may be filled with filtering material, as at L. In the wall of the casing are openings M, which are covered by pieces N and transparent material, thus providing means for examining or inspecting the fluid contents of said casing.

P, Q and R designate branch pipes leading from the chambers H and K, said pipes P, Q, R, being connected with the discharge pipe S.

Leading from the chambers H, J, are air-discharging pipes T, the same being connected with a pipe U, which latter has its discharge end connected with a chamber V of an ejector W, the conveying pipe X of said ejector being connected by means of a branch Y with the discharge pipe S, said ejector having a discharge pipe Z.

Connected with the supply pipe D is a pipe A', which may be connected with the discharge pipe S of an adjacent filter, when more than one filter is employed, thus providing for duplications of the filtering operations or the subjection of the fluid once filtered to additional filtration.

The several pipes enumerated are provided with cocks or valves so that certain pipes may be closed and opened, or all of the pipes closed and opened according to requirements.

It will be seen that the ejector W, primarily removes air and gas from the casing A of the filter, to accomplish which, we admit water or other fluid into the pipe X of the ejector, so as to render the latter operative, and after the fluid begins to flow properly through the casing, the water admitted into the pipe X is cut off, the liquid from the casing continuing to flow through the pipe U into the chamber V, and the pipe Z carrying with it any air or gas in the same. It will also be seen that the fluid from the supply pipe D may enter the chamber J and be filtered in its passage into the chamber K, and furthermore filtered in its passage into the chamber H and discharged through the pipe P, or it may enter the chamber H and filter in its passage into the chamber K and discharge therefrom through the branches R and Q or the fluid may enter both chambers H and J and pass into the chamber K, the two volumes causing the equalization of pressure of the fluid in the chamber K.

In order to increase the filtering action and provide strainers for such solid matters as yeast cells, albuminoids, &c., when beer is being filtered, we employ strips B' of suitable fabric, which are wrapped around the partitions in spiral direction as shown in Fig. 3, the joints between the convolutions allowing the fluid to pass through the same to the partitions, while trapping or stopping said solid matters.

In Fig. 4, we employ pieces C' of the form of endless bands, the same encircling the partitions and operating similar to that in Fig. 3.

Having thus described our invention, what we claim as new, and desire to secure by Letters Patent, is—

1. A casing provided with a central chamber, a peripheral chamber and an intermediate chamber with a supply pipe having branches leading to the central and peripheral chambers, and a discharge pipe with branches leading from the central and intermediate chambers, substantially as described.

2. A filter having a casing with perforate partitions therein, forming central intermediate and peripheral chambers, filling in said intermediate chamber, an inlet pipe for said peripheral chamber, an ejector, an outlet pipe for said central chamber, and air outlet pipes for said peripheral and central chambers leading into said ejector which is connected with the outlet pipe of the central chamber, said parts being combined substantially as described.

3. A filter having central, intermediate and peripheral chambers formed by concentric partitions and provided with an inlet pipe and an air discharge pipe leading from the central chamber thereof, in combination with an ejector into which said pipe leads, and a fluid discharge pipe from said filter, in communication with the inlet pipe of the ejector, substantially as described.

4. A filter consisting of a casing having several chambers therein with intervening filtering material, liquid inlet and discharge pipes for each of said chambers, air discharge pipes for each of chambers, and an ejector, said liquid and air discharge pipes emptying into said ejector, said parts being combined substantially as described.

5. A filter having a casing with partitions therein forming central, intermediate, and peripheral chambers, an inlet pipe for said peripheral chamber, a discharge pipe for said central chamber, air discharge pipes for said central and peripheral chambers and an ejector in communication with said central chamber and air discharge pipes, said parts being combined substantially as described.

EDWIN ADAM.
MARTIN O. REHFUSS.

Witnesses:
JOHN A. WIEDERSHEIM,
A. P. JENNINGS.